US010361512B2

(12) United States Patent
Seido

(10) Patent No.: US 10,361,512 B2
(45) Date of Patent: Jul. 23, 2019

(54) ELECTRICAL CONNECTOR WITH PLUG AND SOCKET

(71) Applicant: WITCO OF JUPITER DENTSU CO., LTD., Tokyo (JP)

(72) Inventor: Toshiyuki Seido, Tokyo (JP)

(73) Assignee: WITCO OF JUPITER DENTSU CO., LTD., Ota-Ku, Tokyo (JP)

(*) Notice: Subject to any disclaimer, the term of this patent is extended or adjusted under 35 U.S.C. 154(b) by 0 days.

(21) Appl. No.: 14/916,939

(22) PCT Filed: Apr. 21, 2015

(86) PCT No.: PCT/JP2015/062150
§ 371 (c)(1),
(2) Date: Mar. 4, 2016

(87) PCT Pub. No.: WO2016/170605
PCT Pub. Date: Oct. 27, 2016

(65) Prior Publication Data
US 2017/0062978 A1 Mar. 2, 2017

(51) Int. Cl.
*H01R 13/629* (2006.01)
*H01R 13/631* (2006.01)
(Continued)

(52) U.S. Cl.
CPC ... *H01R 13/62922* (2013.01); *H01R 13/5219* (2013.01); *H01R 13/631* (2013.01); *H01R 13/64* (2013.01); *H01R 24/86* (2013.01)

(58) Field of Classification Search
CPC .... H01R 13/64; H01R 13/6456; H01R 13/04; H01R 13/052; H01R 13/629;
(Continued)

(56) References Cited

U.S. PATENT DOCUMENTS 3,888,559 A * 6/1975 Geib ............... H01R 13/635
439/157
4,239,325 A 12/1980 Tyson
(Continued)

FOREIGN PATENT DOCUMENTS

JP 2-49386 A 2/1990
JP 5-62734 A 3/1993
(Continued)

OTHER PUBLICATIONS

Machine translation, JP 2010-118224 A (published May 27, 2010).*

*Primary Examiner* — Renee S Luebke
*Assistant Examiner* — Paul Baillargeon
(74) *Attorney, Agent, or Firm* — Greenblum & Bernstein, P.L.C.

(57) ABSTRACT

There is provided a connector in which a plug is put to a socket in any rotational direction around an axis and is guided to a normal position smoothly hereby providing proper connection with a simple structure.
On opposite surfaces of the plug and the socket, there are provided a tilted cam surface and a cam follower with which the plug and the socket are slidably contacted to each other, rotated and positioned in a rotational direction around the axis when the plug is fitted onto the socket axially. At the center of one of the opposite surface of the plug and the socket, a pin-receiving hole is formed, and a center pin at the center of the other fits into the pin-receiving hole before the tilted cam surface comes in contact with the cam follower.

3 Claims, 5 Drawing Sheets

(51) Int. Cl.
*H01R 13/64* (2006.01)
*H01R 24/86* (2011.01)
*H01R 13/52* (2006.01)

(58) Field of Classification Search
CPC .............. H01R 13/631; H01R 33/7657; H01R 13/5219; H01R 13/62922
USPC .... 439/374, 376, 378, 381, 891, 924.1, 379, 439/380, 924.2
See application file for complete search history.

(56) References Cited

U.S. PATENT DOCUMENTS

| | | | |
|---|---|---|---|
| 4,350,401 A | 9/1982 | Allen et al. | |
| 6,338,657 B1* | 1/2002 | Harper | A61B 18/14 439/598 |
| 7,275,949 B1* | 10/2007 | Speaker, IV | H01R 13/5219 439/271 |
| 8,011,942 B2* | 9/2011 | Ohmori | H01R 13/6315 439/314 |
| 8,273,028 B2* | 9/2012 | Harshman | H01R 13/5224 439/668 |
| 2014/0357114 A1* | 12/2014 | Pankau | H01R 13/6272 439/372 |

FOREIGN PATENT DOCUMENTS

| | | | |
|---|---|---|---|
| JP | 6-29042 U | | 4/1994 |
| JP | 2008-130556 A | | 6/2008 |
| JP | 2009-43693 A | | 2/2009 |
| JP | 2010-118224 A | | 5/2010 |
| JP | 2010118224 A | * | 5/2010 |
| JP | 4598327 B | | 10/2010 |
| JP | 2011-65997 A | | 3/2011 |

* cited by examiner

ELECTRICAL CONNECTOR WITH PLUG AND SOCKET

CROSS REFERENCE TO RELATED APPLICATION

This is the U.S. National Stage of International Application No. PCT/JP2015/082510 filed Apr. 21, 2015.

BACKGROUND OF THE INVENTION

The present invention relates to a connector in which a plug is connected to a socket axially.

In such a conventional connector, if a direction for rotating a plug or a socket is changed when the plug is connected to the socket, electric connection is likely varied or a connecting pin is likely broken. In order to keep the relating direction stationary any time, a positioning projections provided on one of the plug and the socket, and a positioning groove for the projection is formed on the other in JP5-62734A, JP2008-130556A and JP2-49386A.

With a tilted cam, a plug is connected to a socket axially and the plug or the socket rotates around an axis, thereby positioning them automatically in U.S. Pat. No. 4,239,325A and JP2010-118224A.

However, in the connector comprising conventional positioning means in JP5-62734A, JP2008-130556A and JP2-49386A, in order that the positioning projection may be put into the positioning groove, it was difficult to align the plug with the socket.

If the plug or the socket is mounted on the back of an electronic device, it is invisible and one has to grope for its position, thereby making it more difficult to connect them.

In U.S. Pat. No. 4,239,325A and JP2010-118224A; the tilted cam is provided on the end face of the plug and socket. When the plug is connected to the socket, the end of the tilted cam comes in contact with part of the circumference of the other tilted cam and slides on the tilted surface. If the plug is not aligned with the socket when the plug is connected to the socket rotation around the axis gets unsmooth owing to bias-contact and sticking phenomenon, and stops before coming to the normal position. It is necessary to try several times, which causes wear in the sliding-contact portion more severely.

In view of the foregoing disadvantages in the prior art, it is an object of the invention to provide a connector having simple structure, in which a plug is connected to a socket in any rotational direction around an axis so that they are guided smoothly to a normal position for the connection.

DETAILED DESCRIPTION OF PREFERRED EMBODIMENT

One embodiment of a connector according to the present invention will be described with the appended drawings.

The connector comprises a plug 1 and a socket 2 which are connected to each other axially. The plug 1 comprises a gripper tube 3 and a body 4 which rotatably fits in the gripper tube 3.

Figure 1:
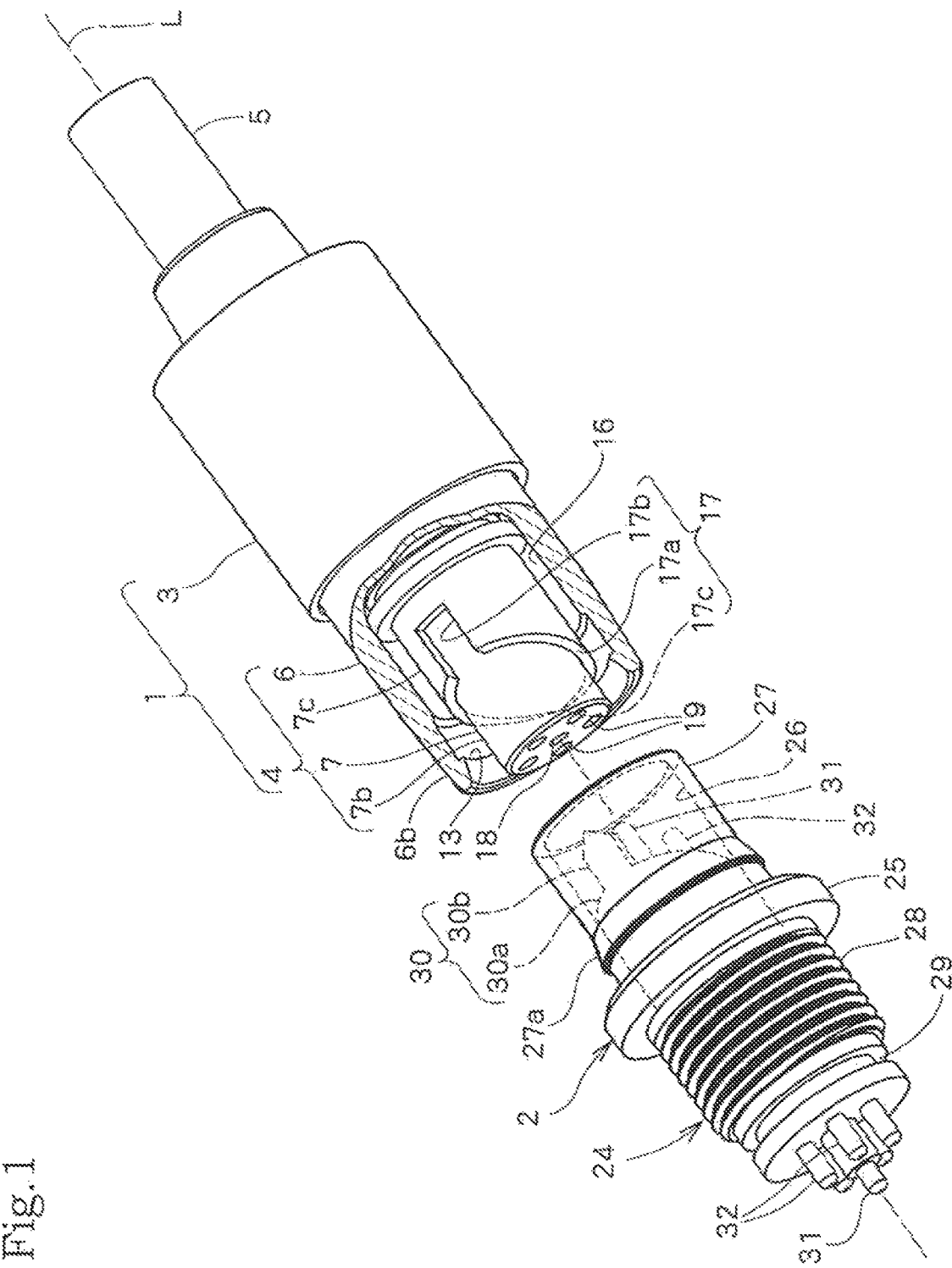
FIG. 1 is a partially cut-away perspective view in which a plug is separated from a socket in one embodiment of a connector according to the present invention.
Figure 2:
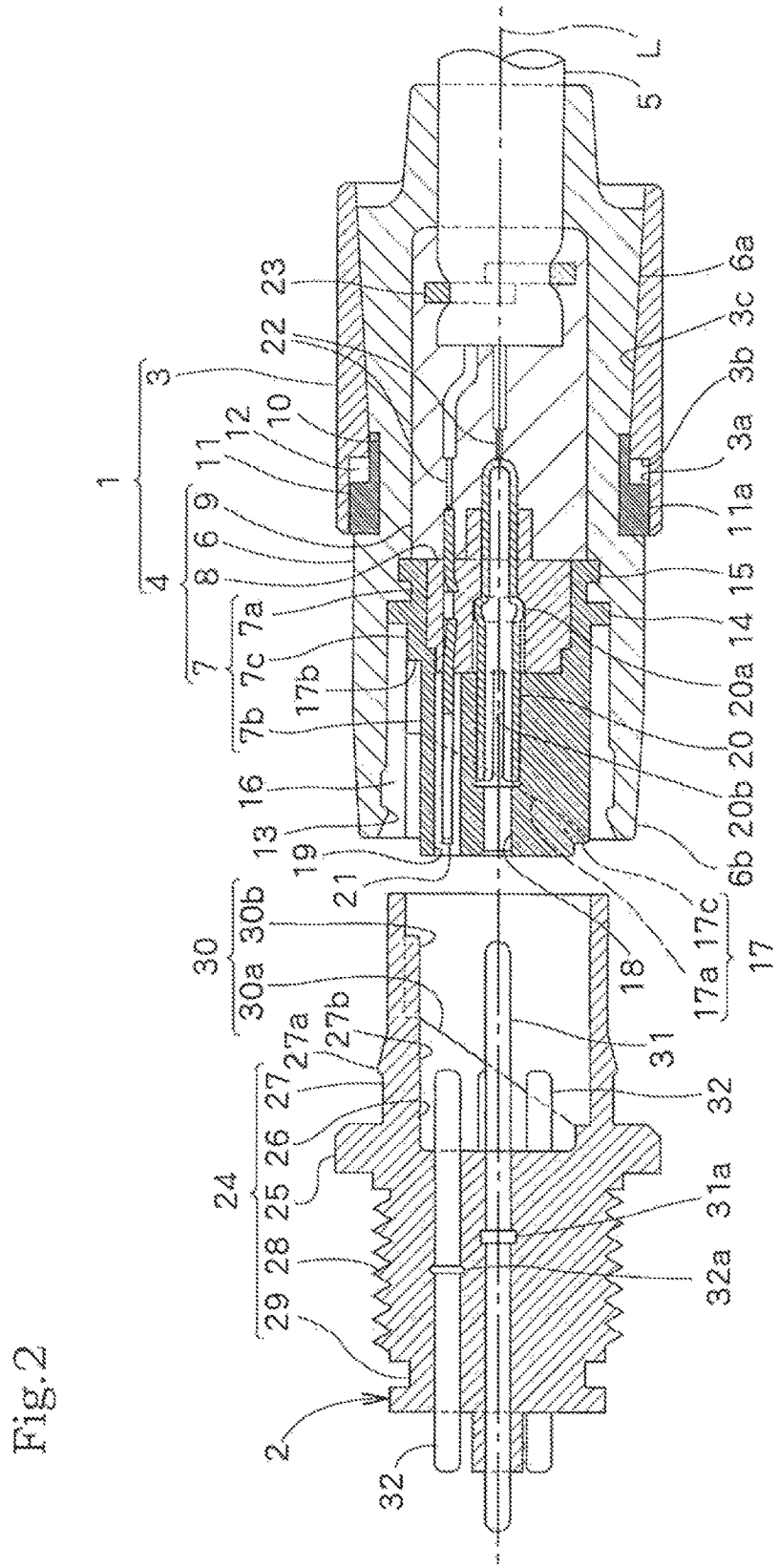
FIG. 2 is a central vertical sectional view thereof.

On the inner surface of the gripper tube 3 close to the distal end (the left end in FIGS. 1 and 2), there is formed a step 3a. On the inner surface from a shoulder 3b perpendicular to an axis "L" of the body 4 at the bottom of the step 3a, there is formed a taper hole 3c which gradually decreases in diameter toward the distal end of the gripper tube 3.

The body 4 comprises a substantially cylindrical outer tube 6 made of waterproof elastic material, one end of a multi-conductor cable 5 fitting in a proximal end of the outer tube 6; an inserting member 7 made of rigid synthetic resin on the inner surface of the body 4 close to the distal end; a contactor-holding member 8 made of more rigid synthetic resin and provided at the proximal end of the inserting member 7; and a synthetic resin filler 9 filled in the outer tube 6 between the contactor-holding member 8 and the proximal end.

An outer circumferential groove 10 is formed on the outer tube 6 in the middle, and a reinforcement ring 11 which has a larger-diameter flange 11a at the end fits in the outer circumferential groove 10.

On the outer circumferential surface from the annular groove 10 of the outer tube 6 to the proximal end, there is formed a taper surface 6a mating with a taper hole 3c of the gripper tube 3.

The gripper tube 3 fits on the outer tube 6 by fitting a larger-diameter flange 11a of the reinforcement ring 11 in the step 3a. When the taper hole 3c closely contacts the taper surface 6a of the outer tube 6, there is formed a space 12 between the shoulder 3b of the step 3a and the larger-diameter flange 11.

Accordingly, the gripper tube 3 can slide toward the distal end relatively with respect to the body 4 until the taper hole 3c goes away from the taper surface 6a of the outer tube 6 and the space 12 is closed, enabling the gripper tube 3 to relatively rotate with respect to the body 4.

Oppositely, the gripper tube 3 moves toward the distal end of the body 4, and the taper hole 3c is in close contact with the taper surface 6a of the outer tube 6, enabling the gripper tube 3 to relatively rotate with respect to the body 4 owing to frictional contact.

On the outer circumferential surface close to the distal end of the outer tube 6, there is formed a taper surface 6b which gradually becomes smaller toward the distal end.

On the inner surface of the outer tube 6 close to the distal end, there is formed an elastic engagement pawl 13.

By molding two larger-diameter flanges 14, 15 embedded in the outer tube 6, the inserting member 7 comprises a basic portion 7a fixed to the cuter tube 6 and an inserting portion 7b close to the distal end and smaller in diameter than the larger-diameter flange 14.

Between the outer circumferential surface of the larger-diameter flange 14 of the basic portion 7a and the inserting portion 7b of the inserting member 7, there is formed a circular receiving portion 16 in which a cylindrical portion 27 of the socket 2 rotatably fits.

On the larger-diameter flange 14 which is a bottom of the receiving portion 16, there is formed a tilted cam surface 17.

For easier understanding, a tubular portion 7c having a predetermined thickness is integrally formed on the outer circumference of the inserting portion 7b of the inserting member 7 and the tilted cam surface 17 is formed on the end face of the tubular portion 7c. The tilted cam surface 17 is substantially the same as what is formed on the bottom surface of the receiving portion 16.

The tilted cam surface 17 comprises a tilted surface 17a tilted with respect to an axis "L" of the body 4; an entering groove 17b in parallel with the axis "L"; and a tip end 17c of the tilted surface 17a.

A pin-receiving hole 18 is formed at the center or along the axis "L" of the inserting portion 7b of the inserting member 7, and five pin-receiving holes 19 are equally spaced circumferentially around the pin-receiving hole 18.

Figure 5:
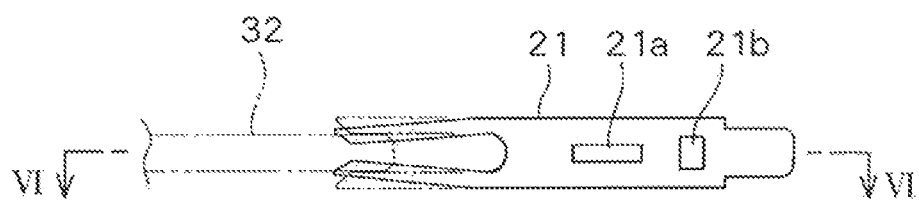
FIG. 5 is a front elevational view of a flat female contactor.
Figure 6:
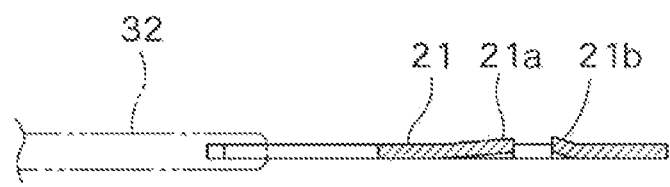
FIG. 6 is a horizontal sectional view taken along the line VI-VI in FIG. 5.

A cylindrical female contactor 20 or a receiving member is firmly held with the contactor-holding member 8 on the pin-receiving hole 18 of the inserting member 7; and a plain female contactor 21 or a receiving member in FIGS. 5 and 6 is firmly held with the contactor-holding member 8.

A retaining annular projection 20a provided in the middle of the female contactor 20. A slot 20b is formed from the end of the female contactor 20, which is forked.

Two retaining cut-and-raised portions 21a, 21b are provided at the back of each of the female contactors 21. The end of each of the female contactors 21 is forked in FIG. 5.

To the proximal end of the female contactor 20, 21 projecting from the proximal end of the contactor holding member 8 is coupled by soldering to the terminal of a core wire 22 which is a coated lead wire brought out of the multi-conductor cable 5 into the body 4.

A retaining tool 23 is provided at the terminal of the multi-conductor cable 5.

The socket 2 comprises a rigid synthetic-resin body 24.

The body 24 has a brim 25 in the middle and, toward the distal end from the brim 25 (rightward in FIGS. 1 and 2), comprises a hole 26 in which the inserting portion 7b can fit and a cylindrical portion 27 coaxial with the axis "L" of the body 24. The cylindrical portion 27 can fit in the receiving portion 16 of the body 4 of the plug 4. The body 24 comprises a male thread 28 and an annular engagement groove 29 on the outer circumference toward the proximal end from the brim 25 (leftward in FIGS. 1 and 2)

On the outer circumferential surface of the cylindrical portion 27 toward the proximal end, there is formed an annular projection 27a which the elastic pawl 13 engages with and disengages from.

A tubular portion 27b of the cylindrical portion 27 is equal to the tubular portion 7c of the body 4 of the plug 1 in internal diameter, external diameter and thickness, and at the end face of the tubular portion 27b, a cam follower 30 faces the tilted cam surface 17.

The cam follower 30 comprises a tilted surface 30a tilted to the axis "L" of the body 24 at an angle equal to or almost equal to the angle of the tilted surface 17a tilted with respect to the axis "L" of the plug 1, and a pointed projection 30b at the distal end of the tilted surface 30a, insertable into the entering groove 17b of the tilted cam surface 17 of the plug 1.

A long center pin 31 is provided along the axis "L" the body 24, and five connector pins 32 are evenly spaced circumferentially.

The distal ends of the center pin 31 and the connector pins 32 project in the hole 26 of the cylindrical portion 27. Particularly, the distal end of the center pin 31 projects toward the distal end of the body 24 longer than the distal ends of the connector pins 32.

When the plug 1 is connected to the socket axially so that the inserting portion 7b of the plug 1 fits in the hole 26 of the socket 2 and the cylindrical portion 27 fits in the receiving portion 18 of the plug 1, the distal end of the center pin 31 is determined in projecting length such that the distal end of the center pin 31 goes into the pin-receiving hole 18 of the plug before the projection 30b of the cam follower 30 comes in contact with the tilted cam surface 17.

The proximal ends of the center pin 31 and the connector pins 32 project from the proximal end of the body 24. Retaining brims 31a, 32a are provided in the middle of the center pin 31 and the connector pins 32.

A circumferentially positional relationship of the cam follower 30 to the projection 30b in the socket 2 is the same as that of the pin-receiving holes 18, 19 to the entering groove 17b of the tilted cam surface 17 in the plug 1.

The male thread 28 of the body 24 of the socket 2 fitted into a hole (not shown) of a case (not shown) for electric or electronic equipment by contacting the brim 25 on the surface of the case, and a nut (not shown) which engages on the male thread 28 is tightened from the inner surface of the case, so that the socket 24 is fixed to the case. Leads (not shown) connected to electric and electronic parts are fixed to the proximal ends of the center pin 31 and connector pins 32 by soldering.

The female contactor 20, 21 of the body 4 of the plug 1 connected to the core wires 22 of the multi-conductor cable 5, and the center pin 31 and connector pin 32 connected to the leads in the electric or electronic equipment constitute connecting means for connecting the plug 1 to the socket 2 electrically when they are connected at a circumferentially normal position around the axis "L".

Then, how to assemble and disassemble the connector and its function will be described.

Holding the gripper tube 3 of the plug 1, the body 4 is put into the socket 2 axially so that the inserting portion 7b fits in the hole 26 of the socket 2, and the cylindrical portion 27 of the socket 2 fits in the receiving portion 16 of the plug 1. Owing to frictional resistance when the plug 1 comes in contact with the socket 2, the gripper tube 3 is moved toward the socket 2 prior to the body 4, and the taper hole 3a is spaced from the taper surface 6a of the body 4, and the stepped surface 3b of the recessed step 3a perpendicular to the axis "L" of the body 4 comes in contact with the larger-diameter flange 11a of the reinforcement ring 11.

In this situation, the body 4 can strongly be pushed with the gripper tube 3 toward the socket 2, and the taper hole 3a of the gripper tube 3 is spaced from the taper surface 6a of the body 4, so that the body 4 is likely to rotate relatively with respect to the gripper tube 3.

As the plug 1 fits on the socket 2, the distal end of the center pin 31 is put into the central pin-receiving hole 18 of the body 4 of the plug 1 thereby achieving alignment of the plug 1 with the socket 2.

Thus, when the plug 1 is connected to the socket 2, the center of the plug 1 does not deviate from the center of the socket 2 thereby connecting the plug 1 to the socket 2 smoothly.

If the circumferential position of the body 4 of the plug 1 is exactly at the normal position with respect to the socket 2, the distal end of the center pin 31 is put into the central pin-receiving hole 18 of the body 4 of the plug 1, and thereafter, the distal end of the projection 30b of the cam follower 30 is put into the entering groove 17b of the tilted cam surface 17 of the body 4. Then, the five connector pins 32 are put into the pin-receiving hole is of the body 4 of the plug 1. Until the socket 2 is inserted into the plug 1, the center pin 31 and connector pins 32 come in contact with the female contactors 20, 21 in the body 4 thereby performing connection of the electrically-connecting means.

If the body 4 of the plug 1 is not in the normal position circumferentially with respect to the socket 2, the distal end of the center pin 31 is put into the central pin-receiving hole 18 of the body 4 of the plug 1, and the distal end of the projection 30b of the cam follower 30 comes in contact with the tilted surface 17a of the tilted cam surface 17 of the body 4. Then, the distal end of the projection 30b slides on the tilted surface 17a, and owing to component of force, the body 4 is rotated toward the normal position with respect to the socket 2 and gripper tube 3.

The body 4 is smoothly rotated with respect to the socket 2 by making the proximal end of the center pin 31 come into the central pin-receiving hole 18 of the body 4 to prevent center run-out between the plug 1 and the socket 2, guiding the outer circumferential surface of the tubular portion 7c with the inner surface of the cylindrical portion 27 of the socket 2, and guiding the inner surface of the outer tube 8 with the outer circumferential surface of the cylindrical portion 27.

The body 4 is smoothly rotated with respect to the gripper tube 3 by separating the taper hole 3c of the gripper tube 3 from the taper surface 6a of the outer tube 6 and holding the stepped surface 3b of the recessed step 3a perpendicular to the axis "L" of the body 4 in contact with the larger-diameter flange 11a of the reinforcement ring 11.

When the body 4 is rotated to the normal position with respect to the socket 2, the proximal ends of the projection 30b of the cam follower 30 come into the entering groove 17b of the tilted cam surface 17 of the body 4, and the five connector pins 32 are inserted into the pin-receiving holes 19 of the body 4 of the plug 1. Then, while the plug 1 is connected to the socket 2 completely, the center pin 31 and connector pin 32 come in contact with the female contactors 20, 21 in the body 4 of the plug 1, performing electric connection of the connecting means.

Slightly before the plug 1 is connected to the socket 2 completely, the elastic engagement pawl 13 of the body 4 of the plug 1 is elastically deformed to get over the annular projection 27a on the outer circumferential surface of the cylindrical portion 27 of the socket 2 and engaged with the annular projection 27a. Hence, the plug 1 is prevented from disengaging from the socket 2 carelessly.

Figure 3:
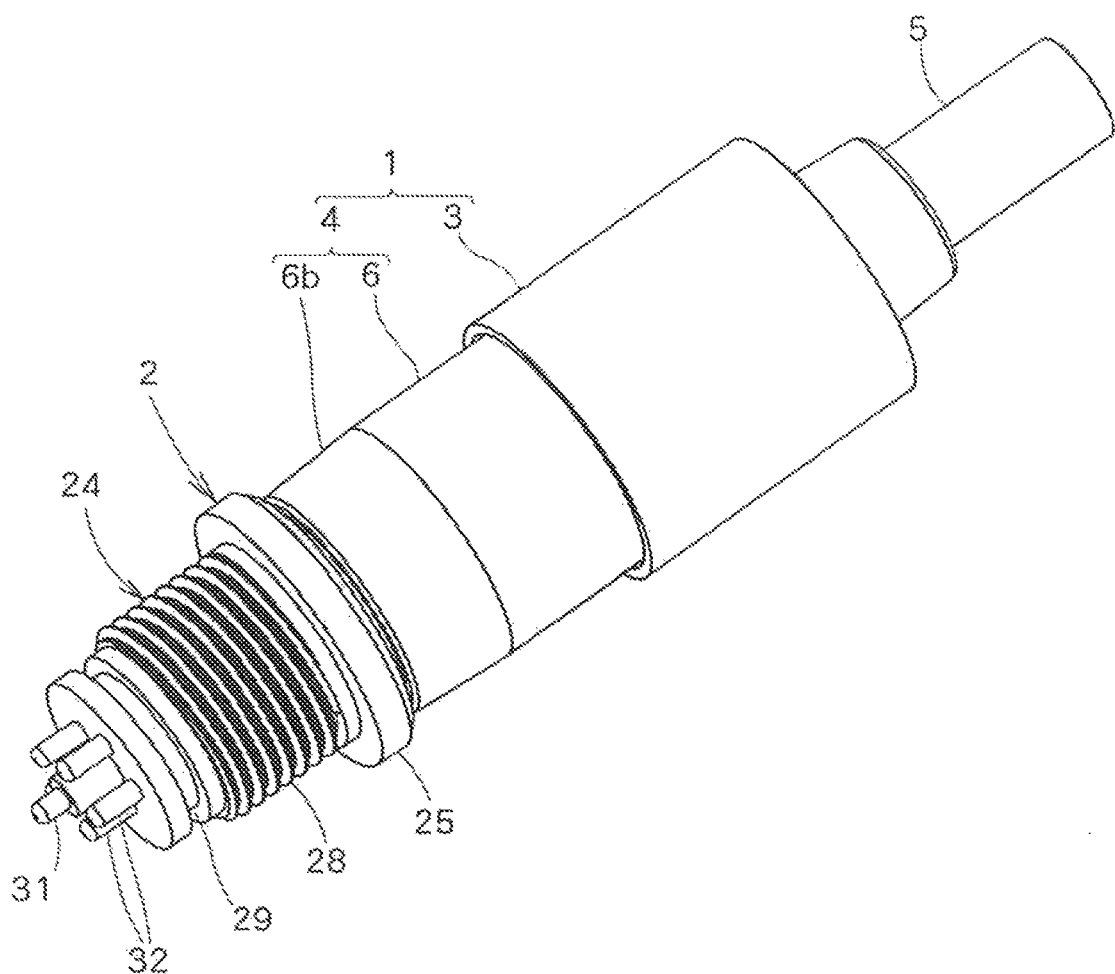
FIG. 3 is a perspective view in which the plug is connected to the socket.
Figure 4:
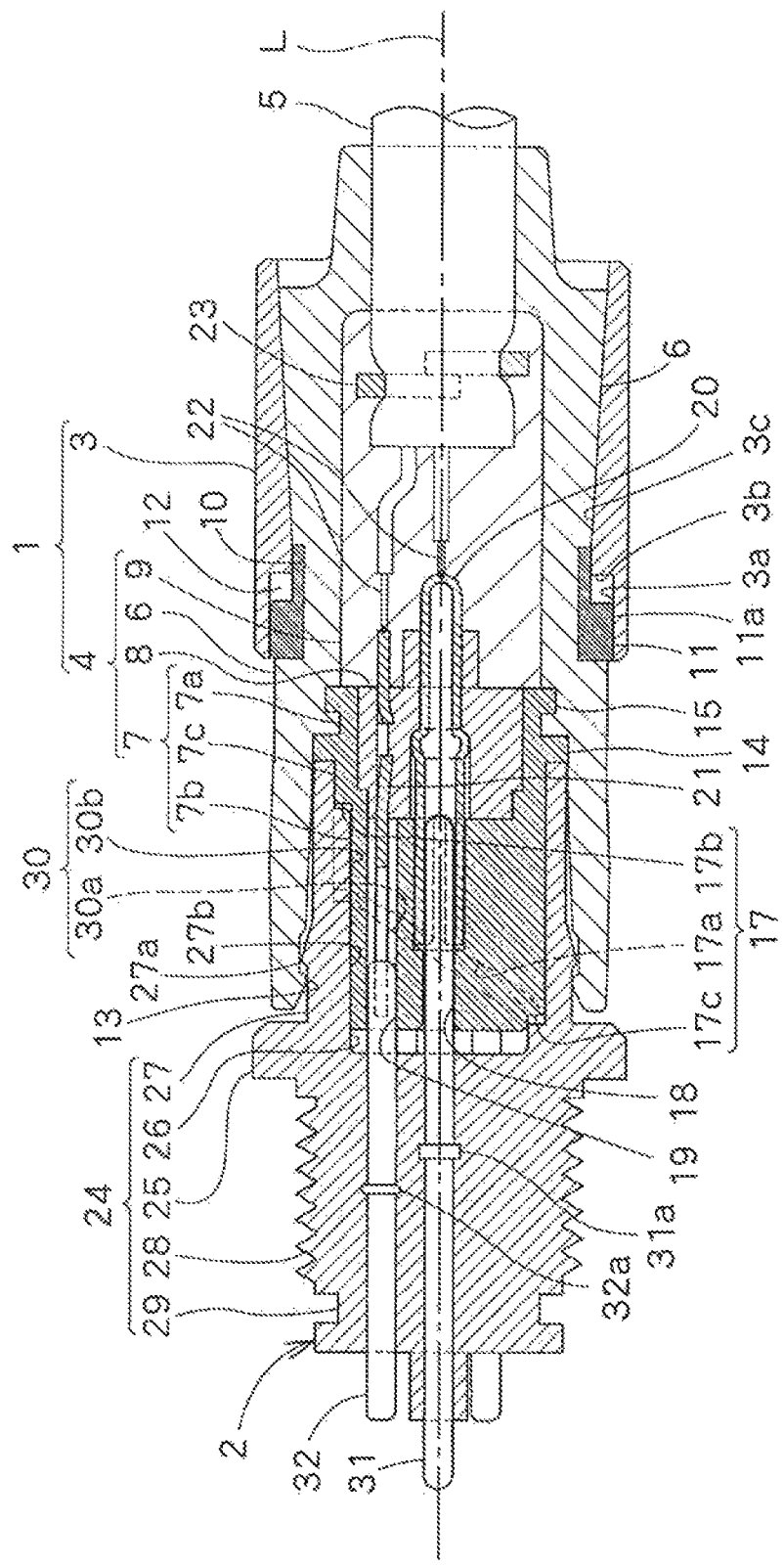
FIG. 4 is a central vertical sectional front view thereof.

In FIGS. 3 and 4, when the plug 1 is connected to the socket 2 completely, because the outer tube 6 made of water-proof elastic material is tightly in contact with the outer circumferential surface of the cylindrical portion 27 of the socket 2, rain water and dust are prevented from entering a contact portion between the center pin 31 and connector pin 32 (connecting means) and the female contactors 20, 21, thereby improving waterproof and dustproof properties.

In order to take the plug 1 off the socket 2, the gripper tube 3 held with a hand may be pulled away from the socket 2.

At the beginning, the taper hole 3a of the gripper tube 3 is tightly in contact with the taper surface 6a of the body 4 and the gripper tube 3 is coupled to the body 4. Then, the elastically engaging pawl 13 of the body 4 of the plug 1 is elastically deformed and gets over the annular projection 27a on the outer circumferential surface of the cylindrical portion 27 of the socket 2. The inserting portion 7b of the plug 1 leaves the inserting hole 26 of the body 24, and the center pin 31 and connector pin 32 as the connecting means leaves the female contactors 20, 21, releasing connection of the connecting means.

As described above, the connector comprises the plug 1 and the socket 2 which is connected to the plug 1 axially. The tilted cam surface 17 of the plug 1 faces the cam follower 30 of the socket 2. When the plug 1 is connected to the socket 2, the cam surface 17 and the cam follower 30 are slidably in contact with each other and are relatively rotated, so that they are positioned to each other around the axis "L". The pin-receiving hole 18 is formed at the center of a opposite surface of one of the plug 1 and the socket 2, and the center pin 31 is projected at the center of a opposite surface of the other of the plug 1 and the socket 2. When the plug 1 is connected to the socket 2 axially the center pin 31 fits in the pin-receiving hole 18 before the tilted cam 17 comes in contact with the cam follower 30. In facing portions between the plug 1 and the socket 2, the electrically connecting means is provided to connect the plug 1 with the socket 2 when they are positioned around the axis "L". Thus, in order to connect the plug 1 to the socket 2, the center pin 3 is inserted in the pin-receiving hole 18 for alignment, and the tilted cam surface 17 comes in contact with the cam follower 30.

When the plug 1 is connected to the socket 2 at a rotational position which differs from the normal position around the axis "L", the plug 1 and socket 2 are relatively rotated around the axis "L" to the normal position and positioned there, thereby achieving exactly suitable connection.

Thus, even if the plug 1 is connected to the socket 2 in any rotational direction, they are guided to the normal position smoothly, so that the connection can be achieved simply and swiftly even if the connection between the plug 1 and socket 2 is not visible.

After the center pin 31 is put in the pin-receiving hole 18 for alignment, the tilted cam surface 17 comes in contact with the cam follower 30 and slides relatively. Sliding can be smoothly performed. Thus, the present invention can solve disadvantages that it was required to stop relative rotation to insert it several times and that the slidably-contacted portion was worn owing to biased contact and stiction phenomenon with deviation of the axis before the plug 1 and socket 2 are positioned suitably.

In one of the plug 1 and the socket 2, the cylindrical portion 27 which is concentric with the center pin 31 or pin-receiving hole 18 is provided, while in the other of the plug 1 and the socket 2, the circular receiving portion 16 with which the cylindrical portion 27 can rotationally fit is provided. On one of the proximal end face of the cylindrical portion 27 and the bottom surface of the receiving portion 18 which face the proximal end face of the cylindrical portion 16, the tilted cam surface 17 is provided, while the cam follower 30 is provided on the other. Relative rotation is guided at the centers of the plug 1 and the socket 2 owing to engagement of the center pin 31 and the pin-receiving hole 18 and at the outer circumference owing to engagement of the cylindrical portion 27 and the receiving portion 16, so that the plug 1 and socket 2 are relatively rotated smoothly, thereby preventing biased contact and stiction phenomenon on sliding surfaces of the plug 1 and the socket 2.

The cam follower 30 comprises the projection 30b which projects in parallel with the center pin 31 or pin-receiving hole 18, and at the bottom of the tilted cam surface 17, the entering groove 17b into which the projection 30b can fit is provided, thereby providing a stroke for connecting the connecting means.

The plug 2 comprises the cylindrical gripper tube 3 and the body 4 which can fit, and the body 4 comprises the tilted cam surface 17, the pin-receiving hole 18 and the connecting means. Hence, while the gripper tube 3 is grasped, the plug 1 is pressed on the socket 2 axially. The body 4 is automatically rotated and positioned between the gripper tube 3 owing to sliding between the tilted cam surface 17 and the cam follower 30 thereby providing good operation.

The present invention is not limited to the foregoing embodiment, and the following variations may be made.

(1) What is similar to the multi-conductor cable 5 is connected to the socket 2 and an intermediate connector for the cable is used.

(2) The socket 2 comprises a gripper tube and a body which is rotatable in the gripper tube as well as the plug 1.

(3) At the proximal end of the cam follower 30, what is the same as the entering groove 17b of the tilted cam surface 17, and what is the same as the projection 30b of the cam follower 30 is provided at the distal end of the tilted cam surface 17. The cam follower 30 is formed as a tilted cam surface having the same shape as the tilted cam surface 17. They are provided on opposite surfaces of the plug 1 and the socket 2. Thus, the design can be simplified.

(4) The gripper tube 3 is not provided. In this case, the body 4 is directly grasped and applied to the socket 2. If a position of the body 4 around the axis "L" with respect to the socket 2 is away from the normal position, the body 4 is guided with sliding between the tilted cam surface 17 and the cam follower 30 and applied to the socket 2 while it is twisted. The body 4 may be held with fingers to allow the twisting.

(5) The center pin 31 and connector pin 32 are provided on the plug 1, and the pin-receiving boles 18, 19 and female contactors 20, 21 as a receiving member are provided on the socket 2.

(6) The center pin 31 comprises an optical fiber in a tube or an optical cable consisting of a plurality of optical fibers. The receiving member to which the center pin 31 is applied is an optical connector to form optical connecting means. The connector pin 32 and female contactor 21 as its receiving member are still electrically connecting means thereby constituting a hybrid connector which can connect different mediums.

The center pin 31 is a conduit through which gas or liquid passes, and the receiving member into which the center pin 31 is inserted is a pipe joint thereby constituting hydraulic connecting means.

INDUSTRIAL APPLICABILITY

The foregoing embodiment relates to an electric connector for the multi-conductor cable 21 to which a plurality of core wires or covered leads are bundled up. The present invention is not limited thereto, but may be applied to a connector for connecting optical cables to which a plurality of optical fibers are bundled up and a hydraulic cable to which a plurality of gas- or liquid-passing tubes are bundled up.

In this case, the electric connecting means may be replaced with optical or hydraulic connecting means.

What is claimed is:

1. An electrical connector comprising a plug and a socket to which the plug is connected,
    wherein the socket comprises:
    a cylindrical portion with a hole;
    only one center pin provided in the hole and protruding axially from a center portion within the cylindrical portion;
    a cam follower provided on the cylindrical portion;
    a projection provided on the cam follower in parallel with the center pin, wherein the projection is the only projection provided within the socket; and
    a plurality of electrical connector pins provided in the cylindrical portion extending so as to surround the center pin,
    wherein the center pin protrudes axially more than the electrical connector pins,
    wherein the plug comprises:
    a body;
    a cylindrical outer tube of the body supported in a gripper tube;
    a circular receiving portion formed inside the cylindrical outer tube of the body, into which the cylindrical portion rotationally fits;
    an inserting member provided inside the circular receiving portion, fixed to the cylindrical outer tube and having a tilted cam surface on the inserting member;
    a first pin-receiving hole provided at a center of the inserting member of the plug for receiving the center pin; and
    a plurality of second pin-receiving holes provided to the inserting member of the plug outside the first pin insertion hole, the second pin-receiving holes corresponding to the electrical connector pins; and
    a tip end, inclined surfaces, and an entry groove, there being only one tip end and only one entry groove in the plug as a whole,
    wherein the cylindrical outer tube of the body is rotatably held about a central axis of the body by the gripper tube, the gripper tube covers only a part of the cylindrical outer tube of the body on a side axially opposite to the circular receiving portion, and axial movement of the cylindrical outer tube with respect to the gripper tube is restricted,
    wherein the inclined surfaces are inclined with respect to the central axis of the body and are constituted by a pair of inclined surfaces continuous from the only one tip end to the only one entry groove via outer surfaces of the inserting member,
    wherein, when a circumferential position of the body of the plug with respect to the socket is in a positional relationship, the entry groove is configured to allow the projection to enter into the entry groove,
    wherein the center pin engages in the first pin-receiving hole, the projection of the cam follower is put into the entry groove of the tilted cam surface and a distal end of the projection comes in contact with the tilted cam surface of the plug thereby rotating the tilted cam surface to a normal position in which the plug is connected to the socket,
    wherein, at the normal position, each of the electrical connector pins is inserted into the second pin-receiving holes, respectively, and the entire outer surface of the cylindrical portion of the socket is covered by the cylindrical outer tube of the plug, and
    an elastic engagement pawl provided on an inner surface of the cylindrical outer tube proximate a distal end thereof, and
    a socket projection provided on an outer circumferential surface of the cylindrical portion of the socket, wherein the engagement pawl is configured to engage with the socket projection, thereby preventing disengagement of the socket from the plug.

2. The electrical connector according to claim 1, wherein, a distal end of the center pin is determined in projecting length such that the distal end of the center pin goes into the pin-receiving hole of the plug before the projection of the cam follower comes in contact with the tilted cam surface, when the plug is put into the socket axially for connecting the plug to the socket.

3. The electrical connector according to claim 1, wherein, the electrical connector is configured such that, when a position of the main body of the plug is not the normal position, the projection of the cam follower slides along the inclined cam surfaces and by rotating the main body relative to the gripper tube, the circumferential position of the main body of the plug with respect to the socket is set to the normal position.

* * * * *